(12) United States Patent
Choi et al.

(10) Patent No.: US 9,575,318 B2
(45) Date of Patent: Feb. 21, 2017

(54) OPTICAL SYSTEM FOR SEE-THROUGH HEAD MOUNTED DISPLAY HAVING THREE WEDGE PRISM ARRANGEMENT FOR SEPARATE ENLARGEMENT IN VERTICAL AND HORIZONTAL DIRECTIONS

(71) Applicant: GREEN OPTICS CO., LTD., Chungcheongbuk-do (KR)

(72) Inventors: Jang-Ho Choi, Chungcheongbuk-do (KR); Dong-Kyun Kim, Chungcheongbuk-do (KR); Sang-Jun Lee, Chungcheongbuk-do (KR)

(73) Assignee: GREEN OPTICS CO., LTD., Chungcheongbuk-do (KR)

( * ) Notice: Subject to any disclaimer, the term of this patent is extended or adjusted under 35 U.S.C. 154(b) by 103 days.

(21) Appl. No.: 14/164,268

(22) Filed: Jan. 27, 2014

(65) Prior Publication Data

US 2015/0212325 A1    Jul. 30, 2015

(51) Int. Cl.
*G02B 27/01* (2006.01)
*G02B 5/04* (2006.01)

(52) U.S. Cl.
CPC ............. *G02B 27/0176* (2013.01); *G02B 5/04* (2013.01); *G02B 2027/0118* (2013.01); *G02B 2027/0174* (2013.01)

(58) Field of Classification Search
None
See application file for complete search history.

(56) References Cited

U.S. PATENT DOCUMENTS

| | | | |
|---|---|---|---|
| 6,201,646 B1* | 3/2001 | Togino et al. | 359/629 |
| 2002/0021498 A1* | 2/2002 | Ohtaka et al. | 359/629 |
| 2002/0063913 A1* | 5/2002 | Nakamura et al. | 359/15 |
| 2005/0254107 A1* | 11/2005 | Amanai | 359/16 |
| 2009/0153969 A1* | 6/2009 | Saito | 359/576 |
| 2010/0066926 A1* | 3/2010 | Tanijiri | G02B 6/0046 349/11 |
| 2010/0245211 A1* | 9/2010 | Iba et al. | 345/8 |

FOREIGN PATENT DOCUMENTS

| | | |
|---|---|---|
| JP | 2002-228971 A | 8/2002 |
| JP | 2009-134087 A | 6/2009 |
| KR | 10-2003-0013640 A | 2/2003 |
| KR | 10-2009-0053316 A | 5/2009 |

\* cited by examiner

*Primary Examiner* — Stephone B Allen
*Assistant Examiner* — Ryan S Dunning
(74) *Attorney, Agent, or Firm* — Revolution IP, PLLC

(57) ABSTRACT

Provided is a see-through head mounted display (HMD) optical system which includes a display device, a collimation lens that parallelizes image lights emitted from the display device, a first wedge prism that includes a first enlargement unit for enlarging an image in a horizontal direction, a second wedge prism that includes a second enlargement unit for enlarging the image in a vertical, and a third wedge prism that has an inverse shape of the second wedge prism so as to prevent the image lights which have been reflected in the second wedge prism and enlarged in the vertical direction and an external image which has passed through the second wedge prism and been provided to a user from being distorted.

8 Claims, 10 Drawing Sheets

HOE Recording Process    HOE Reproduction Process

OPTICAL SYSTEM FOR SEE-THROUGH HEAD MOUNTED DISPLAY HAVING THREE WEDGE PRISM ARRANGEMENT FOR SEPARATE ENLARGEMENT IN VERTICAL AND HORIZONTAL DIRECTIONS

BACKGROUND

1. Field of the Invention

The present invention relates to an optical system for a see-through head mounted display (HMD), and more particularly, to an optical system for a see-through HMD which may enable information to be easily obtained even during outdoor activities, enable large screen viewing while remarkably reducing a volume and weight thereof, and remarkably reduce manufacturing costs to lower a price of products.

2. Discussion of Related Art

In general, a head mounted display (HMD) apparatus is an image display apparatus in which a virtual large screen is created at a distance by forming a focal point of an image light generated at a position very close to eyes using a precise optical device so that a user can view an enlarged virtual image. As a method of the HMD apparatus, a closed type HMD method to enable only an image light emitted from a display device to be viewed while preventing the surrounding environment from being viewed, and a see-through HMD method to enable the image light emitted from the display device to be viewed while enabling the surrounding environment to be viewed through a window may be given. FIG. 1 shows an example of an optical system of the see-through HMD according to the related art.

First, the see-through HMD shown in FIG. 1 is disclosed in Korean Patent Registration No. 10-0928226, and includes an optical system of an HMD apparatus which includes a display device 10 that emits image lights, a polarized light separator 11 that reflects only a specific polarized light among lights emitted from a micro display panel, a phase retardation plate 12 that converts a linearly polarized light reflected in the polarized light separator 11 into a circularly polarized light or converts an input circularly polarized light into a linearly polarized light, a semi-transparent concave reflection mirror 13 that enlarges the circularly polarized light having passed through the phase retardation plate 12 to send the enlarged light to the phase retardation plate 12 again, and a light opening and closing switch panel 14 that is attached to an outer surface of the semi-transparent concave reflection mirror 13 so that ambient lights can be opened and closed.

By the above-described configuration, beams of only 50% having characteristics of P or S waves among all image lights generated from the display device 10 are transmitted or reflected in the direction of 90 degrees by the polarized light separator 11 disposed so as to be inclined by 45 degrees relative to the display device 10, and the transmitted or reflected beams reach the phase retardation plate 12. Next, the image light linearly polarized from the phase retardation plate 12 is converted into a circularly polarized light to reach the semi-transparent concave reflection mirror 13. Next, the light having reached the semi-transparent concave reflection mirror 13 is reflected to become a circularly polarized light with an inverse rotation direction, and passes through the phase retardation plate 12 and the polarized light separator 11 again to reach user's eyes, and therefore an image enlarged in the semi-transparent concave reflection mirror 13 can be viewed by a user.

However, according to the above-described related art, an amount of the image light generated from the display device 10 is lost by 50%, respectively, while the image light generated from the display device 10 passes through the polarized light separator 11 and the semi-transparent concave reflection mirror 13, and therefore only 25% of the initial amount of light may be transmitted to both eyes and 75% thereof may be lost during a reflection process. As a result, a natural color of an original image light is difficult to be implemented, and therefore there is a problem that a high-luminance light source has to be separately used in consideration of a magnitude of the amount of light which is lost in order to provide an image with appropriate brightness to user's eyes.

In addition, since the polarized light separator 11 is diagonally positioned in a space in which the image enlarged in the semi-transparent concave reflection mirror 13 reaches both eyes, there is a structural problem in an increase in a field of view (FOV) or an eye box, which is an object of a typical HMD. Thus, the increase in the FOV and the eye box may cause an increase in the entire size and weight of the HMD. As a result, when wearing the HMD, a user may easily feel fatigue due to pressurization over the entire face of the user.

SUMMARY OF THE INVENTION

The present invention is directed to a see-through head mounted display (HMD) optical system which may enable an image light emitted from a display device and an external image light to be clearly viewed at the same time by minimizing a loss of the image light emitted from the display device, whereby activities such as e-mails, information collection, and the like can be performed during walking to help more efficient business promotion.

The present invention is also directed to a see-through HMD optical system which may maximize a virtual screen size while remarkably reducing a weight and volume of the system, thereby enabling large screen viewing.

The present invention is also directed to a see-through HMD optical system which may minimize lens processing by applying an enlargement method by the use of a wedge prism, thereby reducing the manufacturing costs.

According to an aspect of the present invention, there is provided a see-through head mounted display (HMD) optical system including: a display device; a collimation lens that parallelizes image lights emitted from the display device; a first wedge prism that includes a first enlargement unit for enlarging an image in a horizontal direction in such a manner that the image lights which have passed through the collimation lens and been aligned in parallel are made incident; a second wedge prism that includes a second enlargement unit for enlarging the image in a vertical direction in such a manner that the image lights which have passed through the first wedge prism and been enlarged in the horizontal direction are made incident; and a third wedge prism that has an inverse shape of the second wedge prism so as to prevent the image lights which have been reflected in the second wedge prism and enlarged in the vertical direction and an external image which has passed through the second wedge prism and been provided to a user from being distorted.

The first enlargement unit which is provided in the first wedge prism to enlarge the image in the horizontal direction may be a holographic optical element (HOE) which forms a lattice structure therein so that a direction of a reflection angle is changed to a desired direction.

The first enlargement unit which is provided in the first wedge prism to enlarge the image in the horizontal direction may be a diffractive optical element (DOE) of a saw-tooth structure with an inclination angle so that a direction of a reflection angle is changed to a desired direction by a reflection surface.

The second enlargement unit which is provided in the second wedge prism to enlarge the image in the vertical direction may be an HOE which forms a lattice structure therein so that a direction of a reflection angle is changed to a desired direction.

The second enlargement unit which is provided in the second wedge prism to enlarge the image in the vertical direction may be a DOE of a saw-tooth structure with an inclination angle so that a direction of a reflection angle is changed to a desired direction by a reflection surface.

When an inclination surface of the second wedge prism is a DOE, the third wedge prism may have an inclination surface with an inverse saw-tooth shape of the second wedge prism, so that an optical system compensated to enable a user to view the external image without distortion is provided.

The HMD optical system may further include a convex lens that is provided between the first wedge prism and the second wedge prism to enlarge a field of view (FOV).

The inclination angles of the first and second wedge prisms may be made the same so that ratios of horizontal enlargement and vertical enlargement of the image light are made the same to minimize image distortion.

In the first enlargement unit, the reflection surface may be a 100% reflection coating surface.

In the second enlargement unit, the reflection surface may be a 50% half mirror coating surface.

The first enlargement unit may be a reflection type HOE.

The second enlargement unit may be a reflection type HOE.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. It should be understood that the same configurations throughout the drawings refer to the same signs. Even though particular specific contents are described in the following detailed description, which are intended to help overall understanding. In addition, particular descriptions with regard to related known functions or configurations will be omitted when these are judged to be hinge the gist of the present invention.

While the present invention is shown and described in connection with exemplary embodiments thereof, it will be apparent to those skilled in the art that various modifications can be made without departing from the spirit and scope of the invention.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

Figure 1:
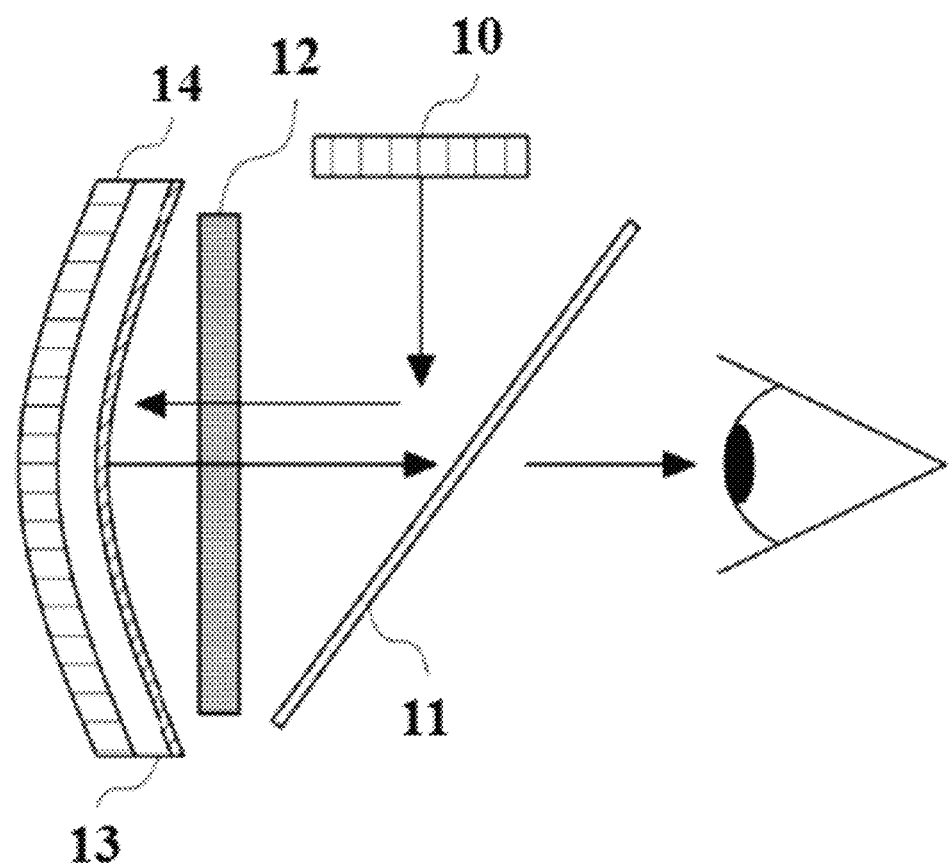
FIG. 1 is a schematic cross-sectional view showing a head mounted display (HMD) optical system according to the related art.
Figure 2:
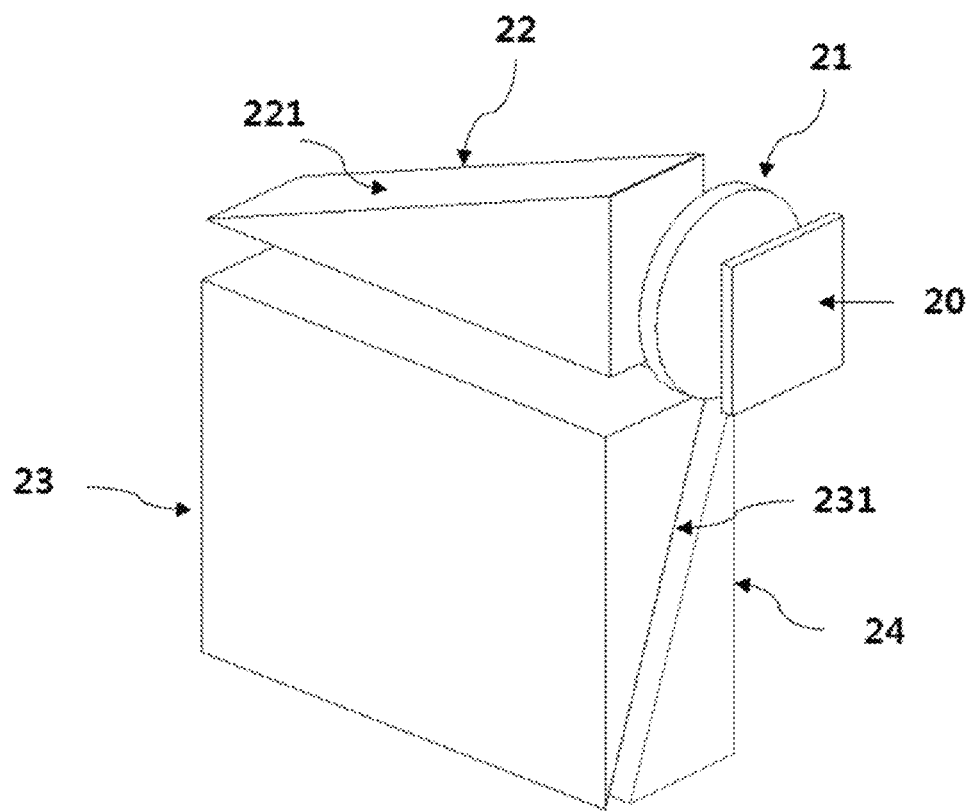
FIG. 2 is a schematic perspective view showing a see-through HMD optical system according to an exemplary embodiment of the present invention.
Figure 3:
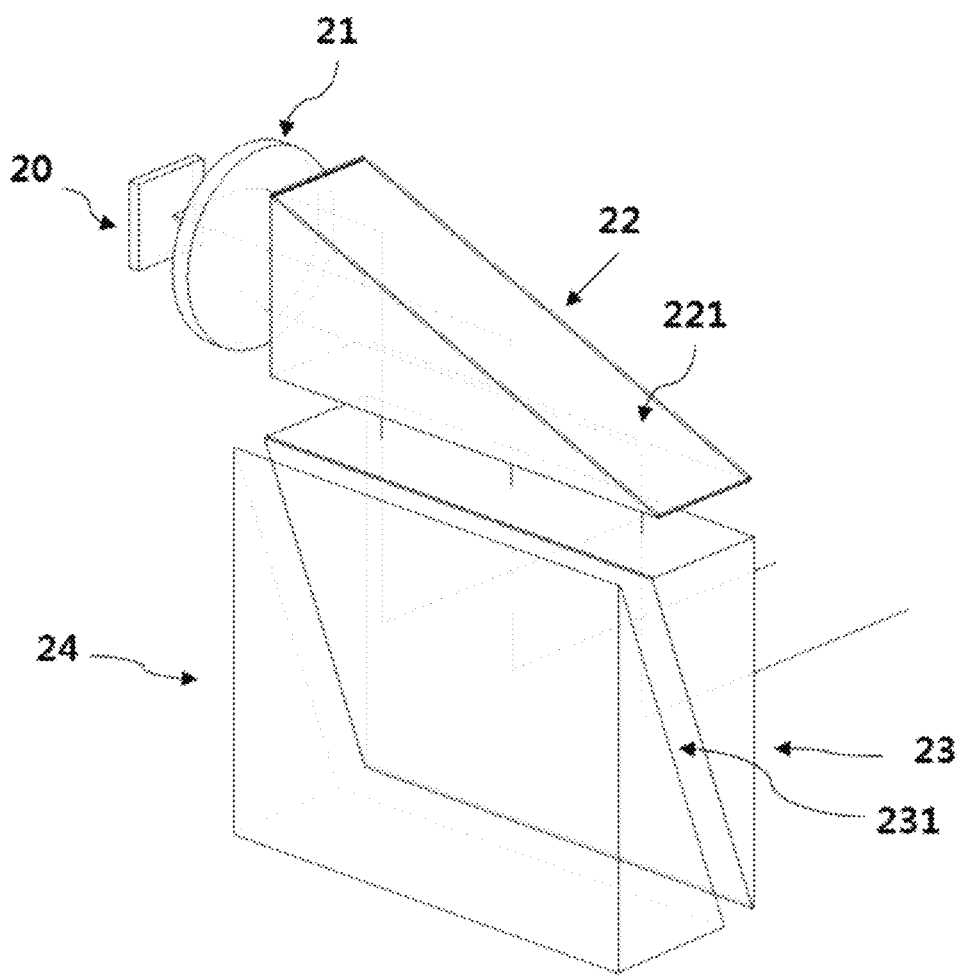
FIG. 3 is a schematic view showing, in a three-dimensional (3D) manner, a path of light in a see-through HMD optical system according to an exemplary embodiment of the present invention.

First, FIG. 2 is a schematic perspective view showing a configuration and disposition of a see-through HMD optical system using a wedge prism according to an exemplary embodiment of the present invention, and FIG. 3 is a schematic view showing a movement path of an image light in a three-dimensional (3D) manner.

The see-through HMD optical system according to an exemplary embodiment of the present invention includes a display device 20, a collimation lens 21, a first wedge prism 22, a second wedge prism 23, and a third wedge prism 24 as shown in FIGS. 2 and 3.

By the above-described configuration, in the see-through HMD optical system according to an exemplary embodiment of the present invention, an image light emitted from the display device 20 is converted into a parallel light through the collimation lens 21 positioned so as to enable their optical axes to be aligned with each other in parallel with the display device 20, and then is made incident to the inside of the first wedge prism 22 to advance in parallel in the horizontal direction. Next, an image size of the image light is enlarged in the horizontal direction by a horizontal image enlargement unit installed on an inclination surface 221 of the first wedge prism 22, and then the image light is reflected vertically downward to be emitted from the first wedge prism 22. In addition, the image light reflected vertically downward from the first wedge prism 22 is made incident to the second wedge prism 23 positioned below the first wedge prism 22, and the image size of the image light is enlarged in the vertical direction by a vertical image enlargement unit positioned on an inclination surface 231 of the second wedge prism 23. Next, the image light is reflected vertically forward to be emitted from the second wedge prism 23, whereby a user can view an image which is significantly enlarged in the horizontal and vertical directions compared to an initial image size in the display device.

In this instance, in order to minimize distortion of the image by enabling ratios of image enlargement in the horizontal direction and image enlargement in the vertical direction to be made the same, inclination angles of the first and second wedge prisms 22 and 23 should be made the same.

In addition, the third wedge prism 24 disposed on a rear surface of the second wedge prism 23 uses the inclination surface as a flat surface when the vertical image enlargement unit of the second wedge prism 23 is a holographic optical element (HOE), and has an inverse saw-tooth shape of a diffractive optical element (DOE) of the second wedge prism 23 when the vertical image enlargement unit of the second wedge prism 23 is a DOE, whereby an optical system compensated to enable a user to view an external image without distortion is provided.

Figure 4A:
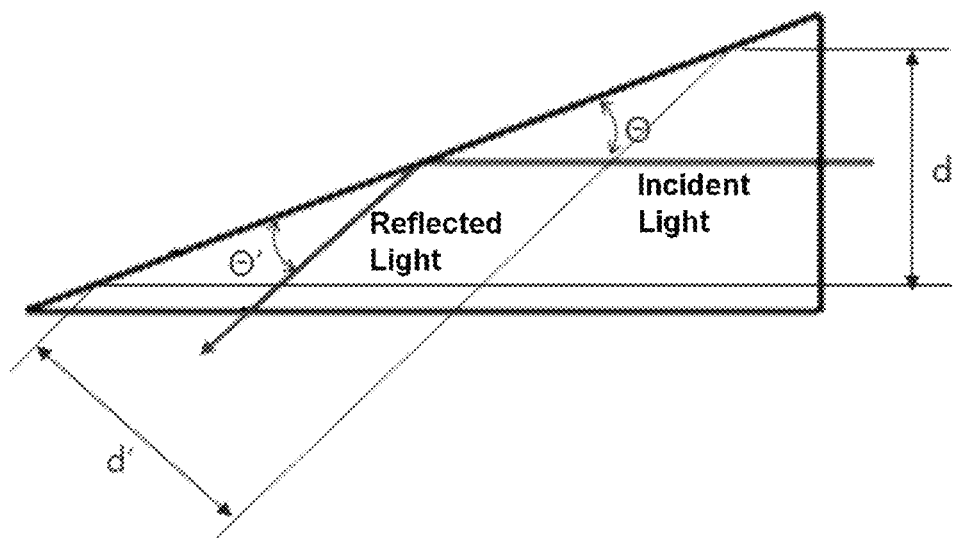
FIG. 4A is a cross-sectional view showing a path of light within a general prism.

FIG. 4A is a view showing the route of a general image light when the vertical image enlargement unit 231 is not provided on the inclination surface of the first wedge prism 22. In FIG. 4A, since an incidence angle θ and a reflection angle θ' of the inclination surface should be the same, a width d of an incident image light and a width d' of a reflected image light are the same, and therefore there is no enlargement effect.

Figure 4B:
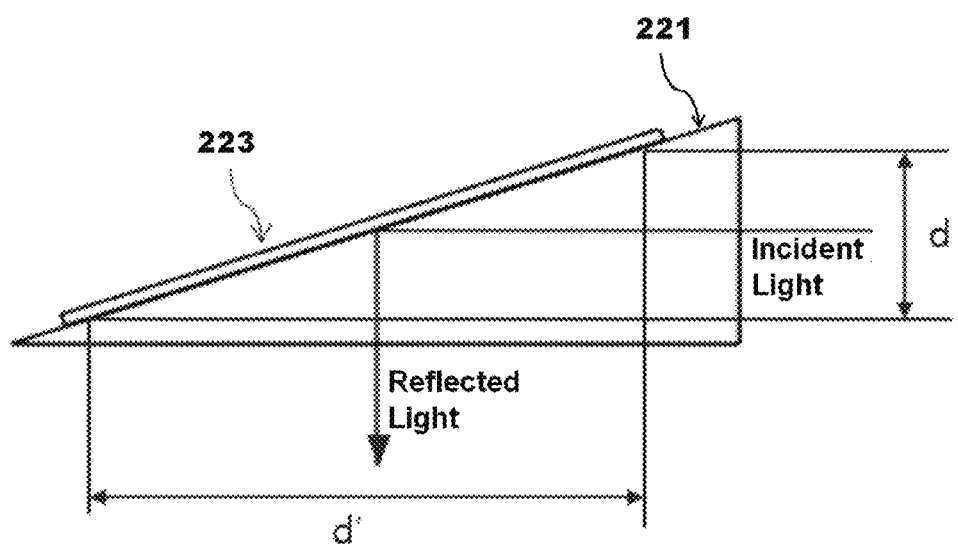
FIG. 4B is a cross-sectional view showing an example of a horizontal image enlargement unit installed on an inclination surface of a wedge prism according to an exemplary embodiment of the present invention.

FIG. 4B is a view showing the route of an image light when an HOE 223 as the horizontal image enlargement unit is provided on the inclination surface 221 of the first wedge prism 22. In FIG. 4B, a pattern input in advance is included in the image light made incident on the inclination surface in the horizontal direction so that an angle at which the image light is diffracted in accordance with wavelengths of image signals inside the HOE 223 is determined, and therefore the image light is reflected vertically downward which is input in advance.

Figure 4C:
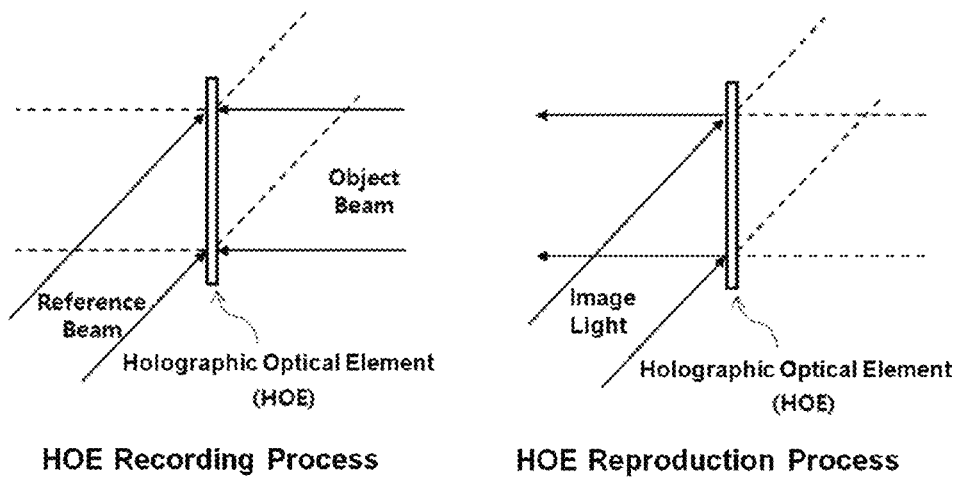
FIG. 4C is a conceptual diagram showing an operation principle of a reflection type holographic optical element (HOE) which is one example of a horizontal image enlargement unit installed on an inclination surface of a wedge prism according to an exemplary embodiment of the present invention.

In order to input a diffraction angle to the HOE 223 in advance, when a laser incident beam (object beam) is horizontally made incident in a direction opposite to the HOE and another laser beam (reference beam) is irradiated to have an inclination angle as shown in FIG. 4C, the diffraction angle is inscribed inside the HOE with a pattern input in advance. When an image light having the same wavelength band as the laser incident beam (object beam) used for the input is irradiated with the same angle as the laser beam (reference beam) used for the input after the input is completed in this manner, the image light is reflected in the opposite direction of the laser incident beam (object beam) by the pattern input in advance, and in this instance, a light width d of the image light is enlarged to d' to be reflected. Such theory and experiment are scientifically verified and used in several fields.

In addition, since the HOE can input patterns using each laser for three primary colors of red (R), green (G), and blue (B), the pattern may be input by simultaneously irradiating RGB lasers to the same HOE in order to implement colors, or the HOE in which each pattern of RGB is input is created and then is attached to the inclination surface in a lamination method. In general, a photo-polymer is used in the HOE 221.

Figure 4D:
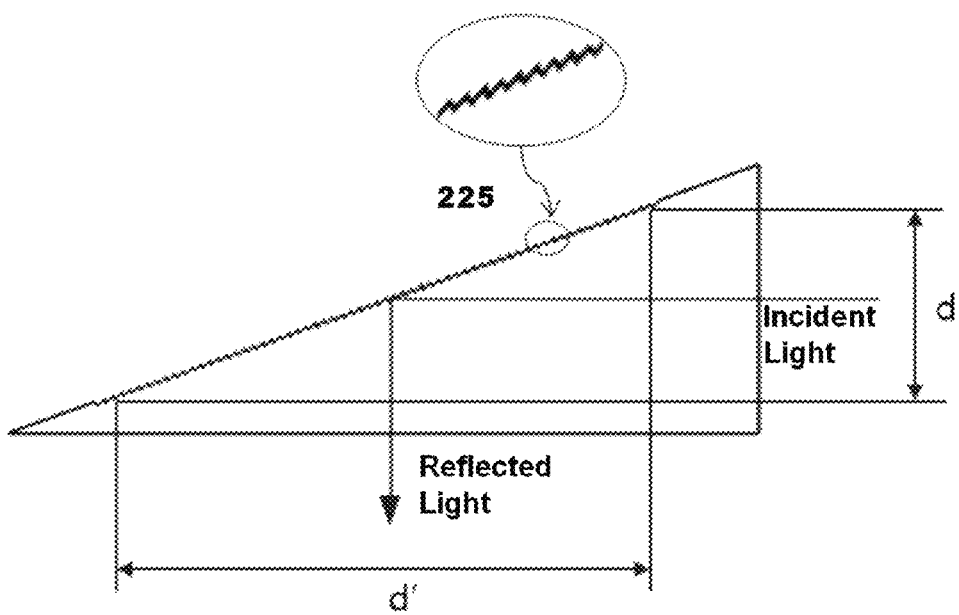
FIG. 4D is a cross-sectional view showing a diffractive optical element (DOE) which is another example of a horizontal image enlargement unit installed on an inclination surface of a wedge prism according to an exemplary embodiment of the present invention.

FIG. 4D is a view showing the route of an image light when a DOE 225 as the horizontal image enlargement unit is provided on the inclination surface 221 of the first wedge prism 22. In FIG. 4D, an image light d which has been made incident on the inclination surface in the horizontal direction is enlarged to the image light d' to be reflected vertically downward by a saw-tooth shaped reflection surface that protrudes from a surface of the DOE 225. In this instance, an interval between each saw-tooth shaped structure should be larger than a wavelength of visible light, and therefore the interval should be at least 10 μm, and should be 200 μm or less when considering a size of each pupil of human eyes. The most ideal interval between each saw-tooth shaped structure is 10 μm to 50 μm when considering that a limitation in which a diffraction grating line can be recognized by human eyes is 50 μm, and a depth of the saw-tooth shaped structure is determined by an interval of a diffraction grating, an angle of the inclination surface, and a function of an angle of a diffraction grating surface. An outer surface of the DOE 225 is subjected to a 100% reflection mirror coating treatment so that the image lights reflected inside the second wedge prism 23 can be all reflected.

Figure 5A:
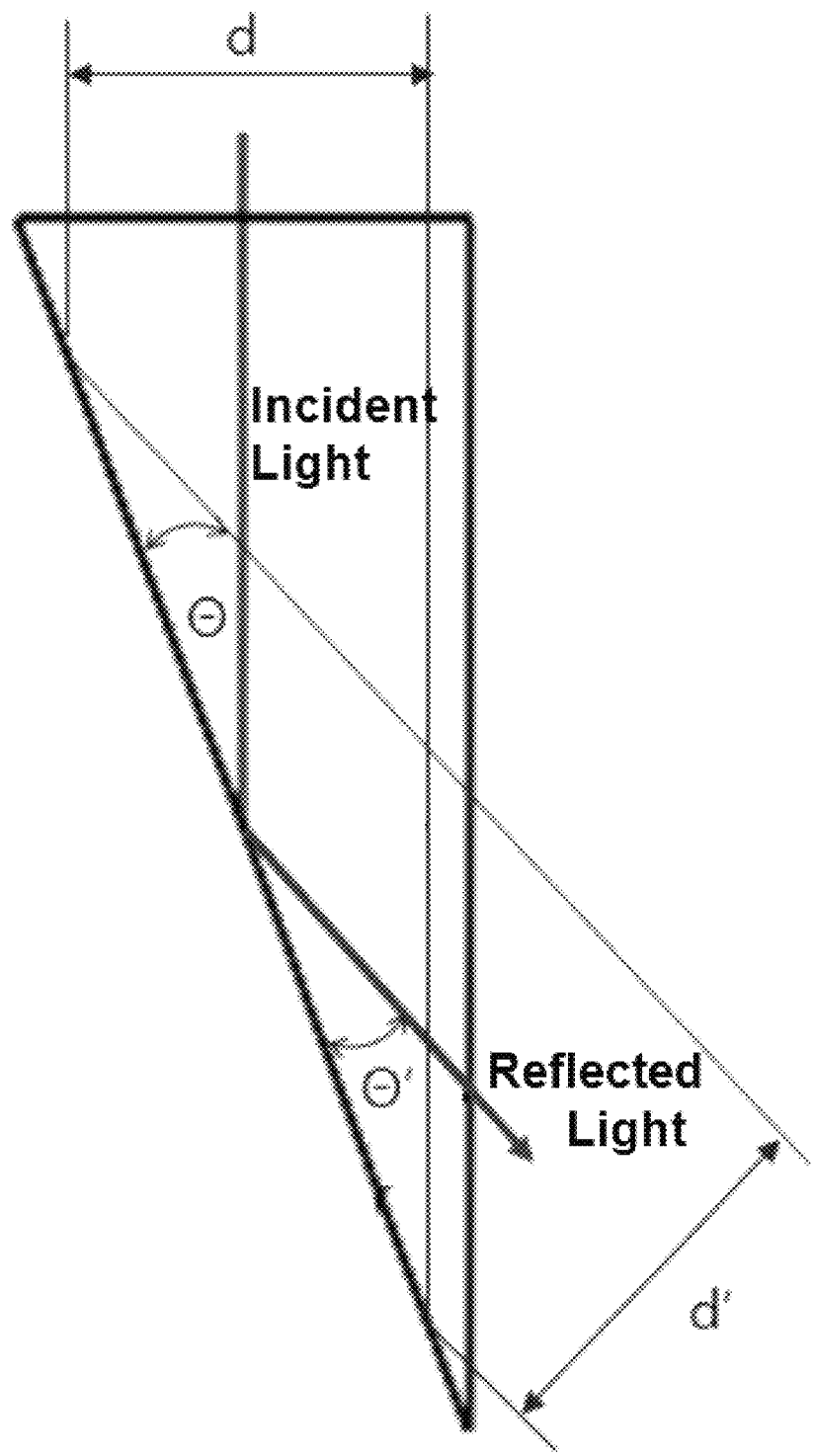
FIG. 5A is a cross-sectional view showing a path of light within a general prism.

FIG. 5A is a view showing the route of a general image light when the vertical image enlargement unit is not provided on the inclination surface of the second wedge prism 23. In FIG. 5A, since an incidence angle θ and a reflection angle θ' of the inclination surface should be the same, a width d of an incident image light and a width d' of a reflected image light are the same, and therefore there is no enlargement effect.

Figure 5B:
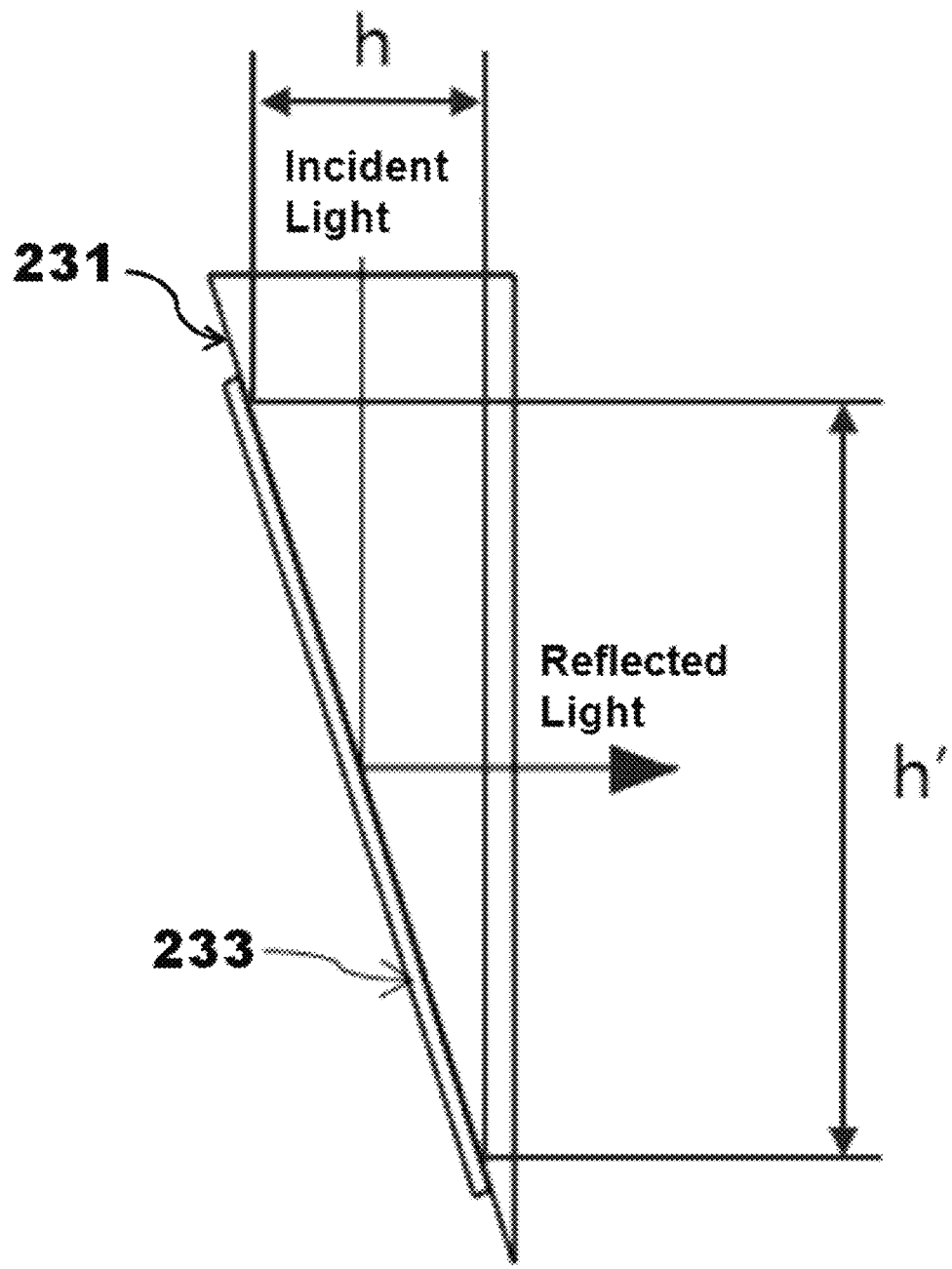
FIG. 5B is a cross-sectional view showing an example of a vertical image enlargement unit installed on an inclination surface of a wedge prism according to an exemplary embodiment of the present invention.

FIG. 5B is a view showing the route of an image light when an HOE 233 as the vertical image enlargement unit is provided on the inclination surface 231 of the second wedge prism 23. In FIG. 5B, a pattern input in advance is included in an image light which has been made incident on the inclination surface in the vertical direction by the same principle as suggested in FIG. 4B so that an angle at which the image light is diffracted in accordance with wavelengths of image signals inside the HOE 233 is determined, and therefore the image light is reflected vertically downward which is input in advance.

Figure 5C:
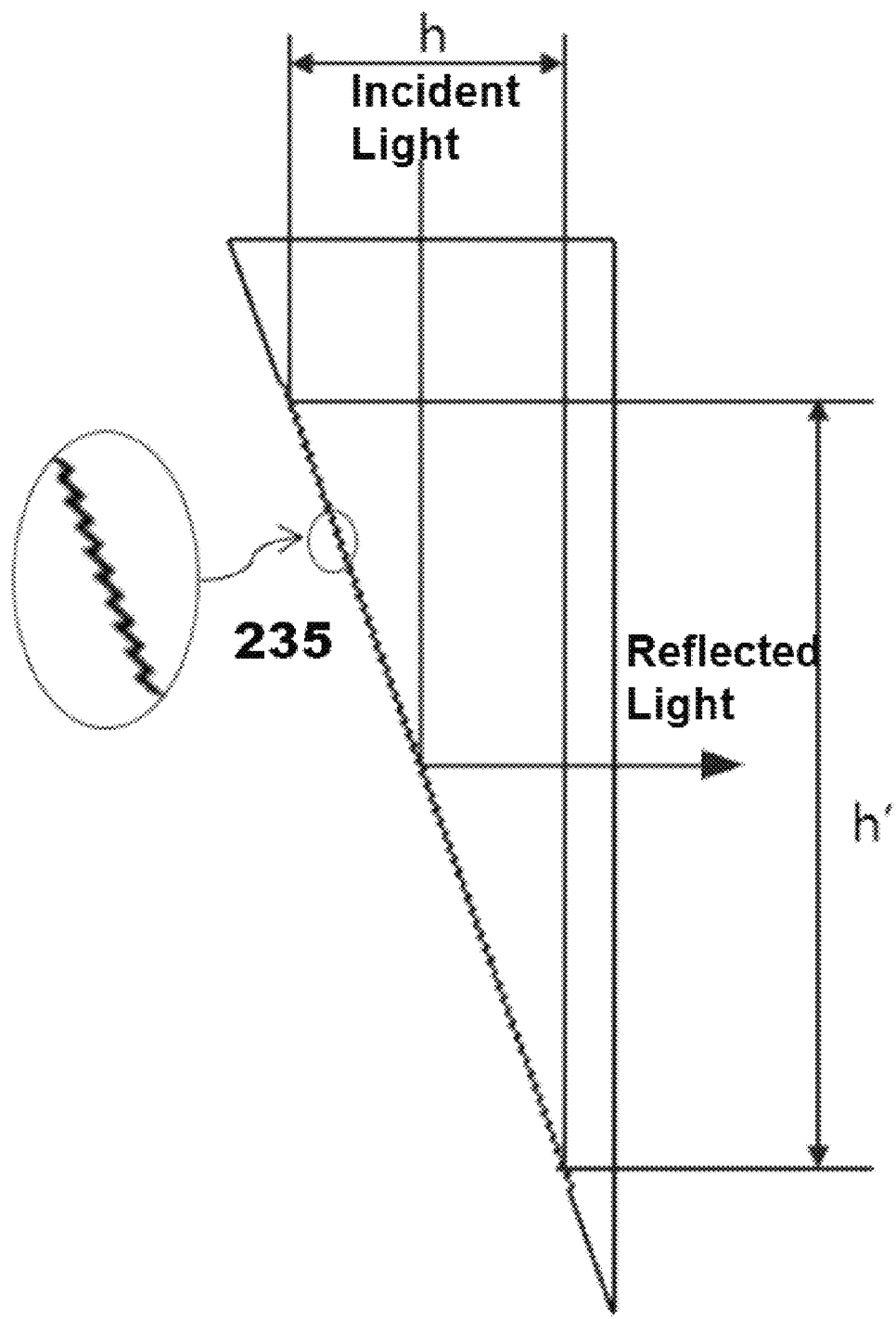
FIG. 5C is a cross-sectional view showing another example of a vertical image enlargement unit installed on an inclination surface of a wedge prism according to an exemplary embodiment of the present invention.

FIG. 5C is a view showing the route of an image light when a DOE 235 as the horizontal image enlargement unit is provided on the inclination surface of the second wedge prism 23. In FIG. 5C, an image light d which has been made incident on the inclination surface in the vertical direction by the same principle as suggested in FIG. 4B is enlarged to an image light d' to be reflected horizontally forward by a saw-tooth shaped reflection surface that protrudes from a surface of the DOE 235. An outer surface of the DOE 235 is subjected to a half-mirror coating treatment so that the image light reflected inside the second wedge prism 23 and an image light transmitted from the outside can be all viewed at the same time.

Figure 6:
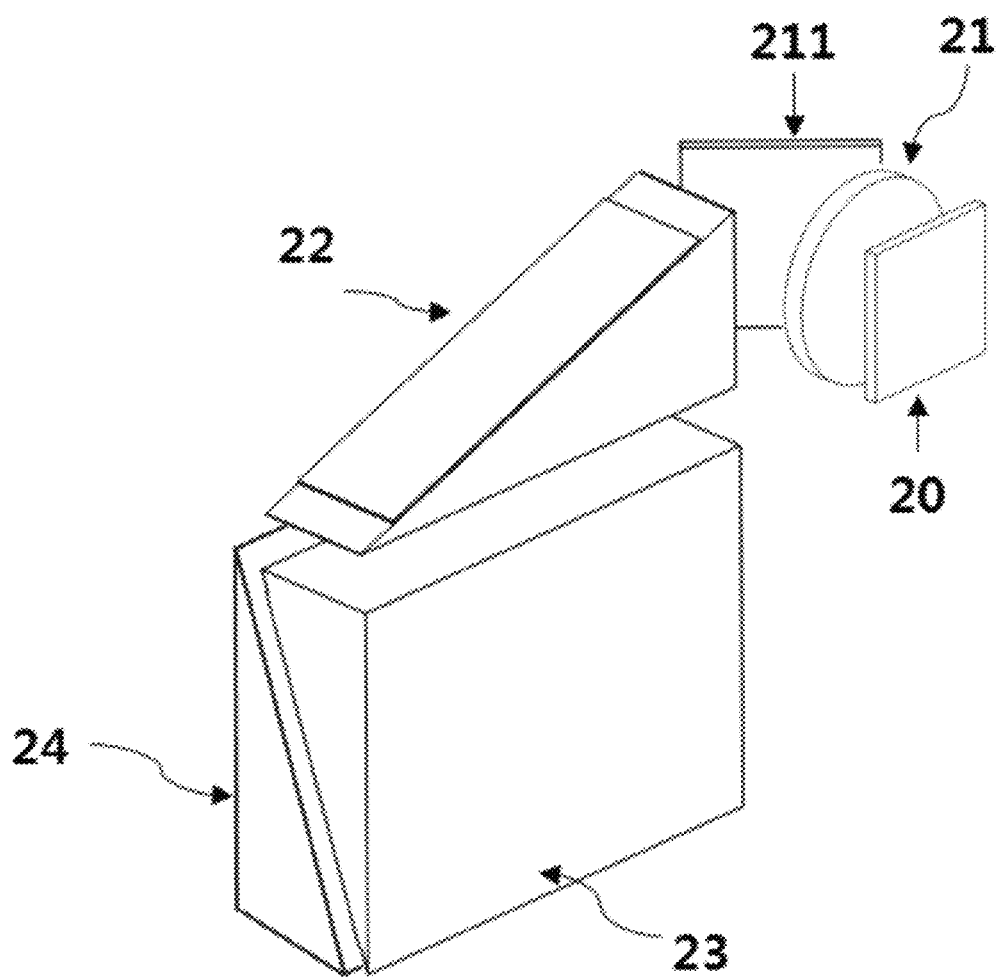
FIG. 6 is a view showing an example of a structure in which a reflection plate is added in a path of light of a see-through HMD optical system according to an exemplary embodiment of the present invention.

FIG. 6 shows an example in which the display device 20 and the collimation lens 21 can be arranged so as to be inserted into a glass frame by adding a 45-degree reflection plate 211 between the collimation lens 21 and the first wedge prism 22 in the see-through HMD optical system of FIG. 2.

By the above-described configuration, the image light emitted from the display device 20 is converted into a parallel light through the collimation lens 21 positioned so as to enable their optical axes to be aligned with each other in parallel with the display device 20, and then is made incident to the inside of the first wedge prism 22 while being rotated by 90 degrees in the 45-degree reflection plate, and therefore an image enlarged by the horizontal and vertical image enlargement unit as described in FIG. 2 may be provided to a user.

Figure 7:
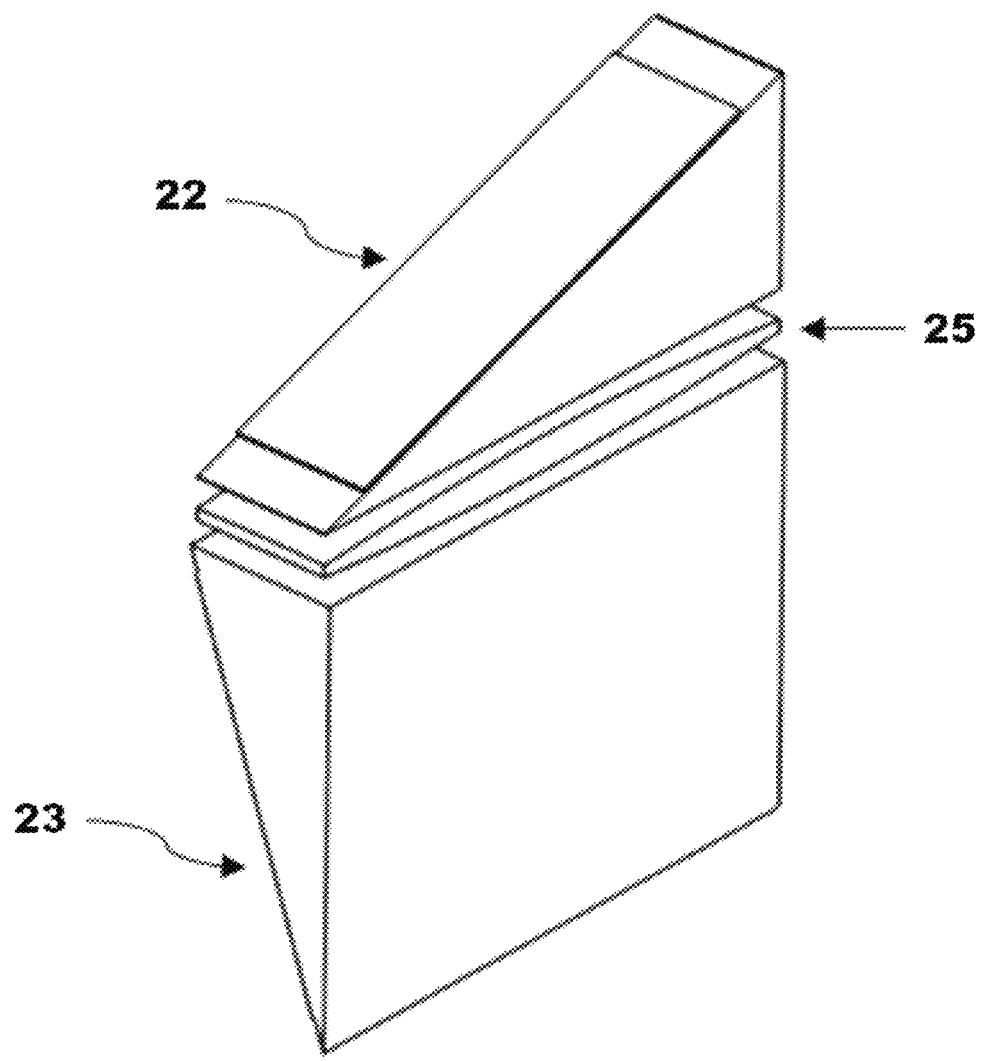
FIG. 7 is a view showing another example of a structure in which an enlargement lens is added in a path of light between a first wedge prism and a second wedge prism according to an exemplary embodiment of the present invention.

FIG. 7 is an example in which a field of view (FOV) is significantly increased by adding a lens 25 which is a means for additionally enlarging the image in the horizontal and vertical directions between the first wedge prism 22 and the second wedge prism 23 in the see-through HMD optical system of FIG. 2.

The see-through HMD optical system according to the exemplary embodiments of the present invention having the above-described configuration can enlarge the image using the horizontal image enlargement unit provided in the first wedge prism 22 and the vertical image enlargement unit provided in the second wedge prism 23, and therefore the use of lens for enlarging the image can be minimized and the image can be enlarged so as to enable large screen viewing despite a thin thickness of the optical system.

In addition, a very bright and clear image of almost the same level as an original image may be provided by maximally suppressing the use of a means for compelling a light loss such as a half-mirror.

As described above, according to the exemplary embodiments of the present invention, the see-through HMD optical system may enable an image light emitted from a display device and an external image light to be clearly viewed at the same time by minimizing a loss of the image light emitted from the display device, whereby activities such as e-mails, information collection, and the like can be performed during walking to help more efficient business promotion.

In addition, the see-through HMD optical system may maximize a virtual screen size while remarkably reducing a weight and volume of the system, thereby enabling large screen viewing.

In addition, the see-through HMD optical system may minimize lens processing by applying an enlargement method by the use of a wedge prism, thereby reducing the manufacturing costs.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A see-through head mounted display (HMD) optical system comprising:
    a display device;
    a collimation lens that parallelizes image lights emitted from the display device; a first wedge prism comprising a vertical surface, an inclined surface, a horizontal surface which forms a bottom of the first wedge prism, and two parallel surfaces which form side surfaces of the first wedge prism, the vertical surface configured to receive the parallelized image lights incident from the collimation lens;
    a second wedge prism comprising a horizontal surface which faces the first horizontal surface of the first wedge prism, an inclined surface, two parallel surfaces which form side surfaces of the second wedge prism, and a vertical surface; and
    a third wedge prism comprising an inclined surface, a first horizontal surface which forms a bottom of the third wedge prism, and two parallel surfaces which form side surfaces of the third wedge prism, and a vertical surface, the second wedge prism and the third wedge prism being in inverse shape to each other, wherein
    the first wedge prism comprises a first enlargement unit for enlarging an image in a horizontal direction, the image which having been passed through the vertical surface of the first wedge prism incident from the collimation lens,
    the second wedge prism comprises a second enlargement unit at the inclined surface of the second wedge prism for enlarging an image incident from the horizontal surface of the first wedge prism in a vertical direction, wherein
    an inclination angle corresponding to the inclined surface of the first wedge prism and an inclination angle corresponding to the inclined surface of the second wedge prism is the same inclination angle, and
    the inclined surface of the third wedge prism and the inclined surface of the second wedge prism are obliquely configured in parallel and symmetrically facing each other, and wherein
    a ratio between the horizontal enlargement corresponding to the first wedge prism and the vertical enlargement corresponding to the second wedge prism is the same according to the configuration of the same inclination angle with respect to the inclined surfaces corresponding to the first wedge prism and the second wedge prism, and
    an image distortion is reduced due to the same inclination angle and same ratio of image enlargement in the horizontal direction only by the first wedge prism and image enlargement in the vertical direction only by the second wedge prism.

2. The HMD optical system of claim 1, wherein the first enlargement unit is a holographic optical element (HOE) which forms a lattice structure therein so that a direction of a reflection angle is changed to a desired direction.

3. The HMD optical system of claim 1, wherein the first enlargement unit is a diffractive optical element (DOE) of a saw-tooth structure with an inclination angle so that a direction of a reflection angle is changed to a desired direction by a reflection surface.

4. The HMD optical system of claim 2, wherein the second enlargement unit is an HOE which forms a lattice structure therein so that a direction of a reflection angle is changed to a desired direction.

5. The HMD optical system of claim 3, wherein the second enlargement unit is a DOE of a saw-tooth structure with an inclination angle so that a direction of a reflection angle is changed to a desired direction by a reflection surface.

6. The HMD optical system of claim 1, wherein the inclined surface of the third wedge prism has a saw-tooth shape inverse to the second enlargement unit of the second wedge prism.

7. The HMD optical system of claim 1, further comprising:
    a convex lens that is provided between the first wedge prism and the second wedge prism to enlarge a field of view (FOV).

8. The HMD optical system of claim 1, wherein each inclination angle of the first and second wedge prisms is the same, and wherein
ratios of horizontal enlargement and vertical enlargement of the image light corresponding to the first and second wedge prisms are the same to minimize image distortion.

* * * * *